Patented Nov. 16, 1948

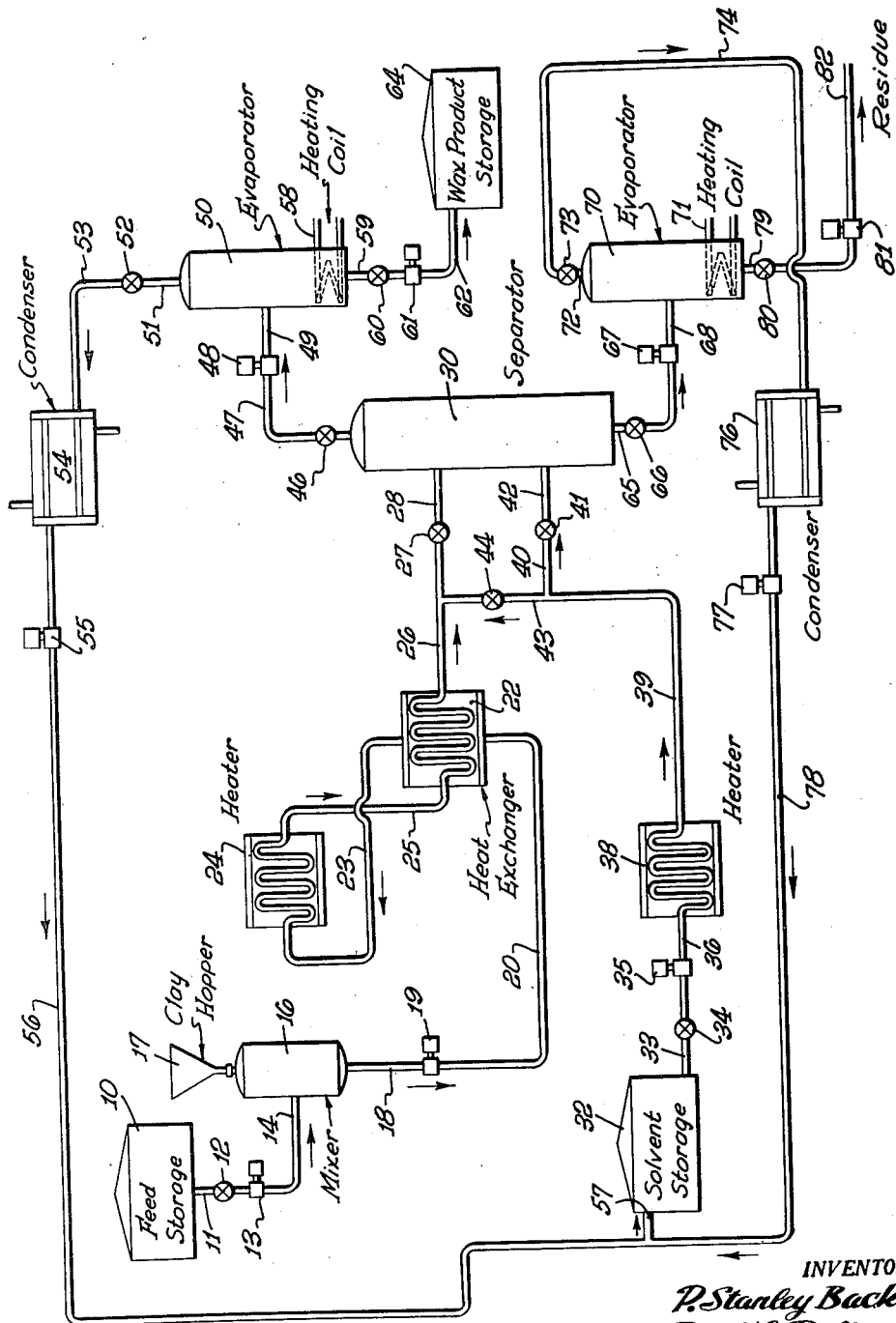

2,453,933

UNITED STATES PATENT OFFICE 2,453,933

REFINING OF WAX

Paul L. Polizzotto and Peter Stanley Backlund, Los Angeles, Calif., assignors to Union Oil Company of California, Los Angeles, Calif., a corporation of California Application February 10, 1945, Serial No. 577,183

6 Claims. (Cl. 196—17)

This invention relates to the decolorization of wax by the separation of the wax from a mixture thereof with asphaltic and resinous materials and comprises a method of decolorizing and purifying waxes which normally require excessive amounts of clay to so treat.

Petroleum waxes which can be obtained by separation from petroleum oils are mixtures of high molecular weight paraffins, probably normal or isoparaffins having from about 20 to about 40 carbon atoms in their molecular structure. Upon distilling crude oils the waxes are concentrated in the high boiling fractions normally employed in the preparation of lubricating oils and inasmuch as these waxes will interfere with the lubricating quality of such oils at low temperatures it is necessary to treat those stocks in which they are contained to effect their removal. Further, these waxes upon separation from the stocks in which they are contained become valuable by-products and are in most part readily marketable.

There are many processes which are currently employed to effect the separation of such wax-oil mixtures which, however, utilize the similar principle of chilling the oil-wax mixture to effect the precipitation of said wax and separating the precipitated wax from the mixture in the presence of a diluent such as the ketones, aromatics, petroleum naphthas and mixtures of these. From this separation an oil containing wax, commonly known as "slack wax" is obtained which must be further deoiled by a process similar to the above to obtain an oil-free wax. Recent developments in the art include such modifications of the above described process as a reversal of the procedure in which the deoiling is accomplished prior to the dewaxing. In either case, however, a wax is obtained which due to the presence of asphaltic and resinous materials therein is colored, which color is a function of the quantity of the color bodies in the wax and may range from light yellow to dark brown or even black. Such waxes as may be obtained from petroleum, have melting points from below 100° F. to about 200° F. and in most cases further refining to remove these color bodies is necessary to produce a marketable wax.

The conventional method of decolorizing waxes involves the use of sulfuric acid or clay treatment to adsorb or remove the asphaltic or resinous materials contained therein. For example, a wax may be heated to a temperature above its melting point and preferably to a temperature of 300° F. or above, whereupon it is percolated through a column of an adsorbent type material such as the various types of clay, bauxite, fuller's earth or the like. This type of refining becomes in certain instances prohibitive, due to the large quantities of clay required to bring about sufficient decolorization of the waxes. Another type of decolorizing procedure involves the use of liquefied normally gaseous hydrocarbons employed at elevated temperatures to effect the precipitation of the asphalt from the wax. In this method of operation the decolorizing and deoiling steps may be combined by effecting the solution of the wax and oil in the liquefied hydrocarbon such as for example propane at a sufficiently elevated temperature and pressure to maintain the wax in solution wherein the asphalt is precipitated from the oil-wax mixture which oil-wax mixture is subsequently chilled by the simple evaporation of the propane under reduced pressure for example to precipitate the wax from the oil which is subsequently separated by filtration or the like. This process, however, has the disadvantage of requiring comparatively high pressures as for example about 300 pounds per square inch to maintain the wax-propane solution at a temperature sufficient to effect the precipitation of the asphalt therefrom.

It is an object of our invention therefore to refine and decolorize more economically those waxes which have heretofore been difficult and expensive to decolorize.

Broadly, it is our object to provide an economical and effective process for the decolorization of any wax which because of the presence therein of asphaltic or resinous materials has an undesirably dark color.

It is a further object of the invention to eliminate or materially reduce the excessive clay consumption associated with the decolorization of certain types of wax.

Another object of our invention resides in the resolution of wax-oil-asphaltic mixtures into their constituent components in a continuous and economical operation.

Other objects and advantages of the invention as herein disclosed will become apparent to those skilled in the art as the description thereof proceeds.

In the following description the terms "asphaltic" and "resinous" material are taken to be synonymous with color bodies inasmuch as it is generally considered that these types of compounds are responsible for the color existing in the crude waxes as obtained from petroleum.

We have found that by extracting wax-asphalt mixtures with a particular class of solvents as hereinafter disclosed at temperatures above the melting point of the wax but not substantially above about 275° F. we are able to obtain a phase separation within the solvent-wax-asphalt mixture due to the higher solubility of the wax in the solvent at the temperatures of the operation than that shown by the asphalt. Thus we are able to separate an upper phase from the mixture comprising essentially solvent-wax solution from which we are able to obtain refined wax by evaporation of the solvent therefrom. The lower phase containing the asphaltic or resinous color bodies will also retain small amounts of solvent which may be recovered therefrom by evaporation and subsequent condensation. Although the elements of this invention have been simply described in the terms of a one-stage extraction, we have found that it is preferable to operate in a countercurrent extraction column wherein the wax-asphalt feed is injected into the column at a point above that of solvent injection, both solvent and wax-oil feed being introduced to the column at the desired temperature of operation. In this manner of operation the wax-solvent mixture comparatively free of asphaltic materials is continuously removed from the top of said extraction column, the solvent being removed from said mixture as hereinbefore described and the asphaltic residue is continuously withdrawn from the bottom of said column with recovery of solvents therefrom as described.

We have found that the alcohols, ketones and ethers of low molecular weight are excellent solvents for bringing about this selective extraction. The solubility of the wax in these solvents appears to increase with the molecular weight of the solvent but at the same time the solubility of the asphalt also increases with the molecular weight. We have found, however, that if these solvents are within the range defined by the presence of less than 6 carbon atoms in their molecular structure the solubility of the wax therein at the temperatures of operation is considerably above the solubility of the asphaltic or resinous materials. In this regard the temperature of operation is also comparatively critical inasmuch as the higher the temperature the more soluble becomes the asphaltic materials and the lower the temperature the less soluble becomes the wax. For this reason we have found that it is necessary to operate the extraction at temperatures above the melting point of the wax and not above about 275° F. and preferably below about 240° F.

We have further found that the incorporation of small amounts of clay, as for example below about 10%, in the wax asphalt feed has the effect upon contacting the solvent in the extraction column of accelerating the separation of the wax and asphalt bringing about not only more rapid separation but yielding a product which is more effectively decolorized. As is shown in the examples as hereinafter disclosed this amount of clay has no appreciable effect on such a wax-asphalt feed in the absence of the solvent extraction and in this method of operation is only an aid to our process. It also may be pointed out that an initial solvent extraction in the absence of clay followed by a clay treatment is materially less effective than a process in which the clay is incorporated in the feed prior to the extraction. In many stocks this addition of clay is not necessary, the solvent extraction of our invention being sufficient to effect decolorization. However, in extreme cases such as the wax obtained from the tank bottoms of certain California crudes in which the asphalt content is sufficiently high to cause a color ranging from dark brown to black, the addition of clay has been found to be desirable. We have found that in those cases where it is desirable to include the usage of comparatively small amounts of clay in the process the clay is more effective if the clay feed mixture is heated to a temperature of about 300° F. or higher which heating appears to have the effect upon subsequent extraction at a somewhat lower temperature of accelerating the adsorption on or the precipitation by the clay of the higher molecular weight asphaltic or resinous materials.

Our invention may be more readily understood by reference to the diagrammatic view of the operation. In the diagram the colored or asphalt-containing wax is taken from tank 10, wherein it is maintained as a liquid by steam coils or the like via line 11 controlled by valve 12 pumped by pump 13 through line 14 into the mixing chamber 16. If clay addition is to be employed it is added from hopper 17 into the mixer 16 wherein the clay and wax are intimately mixed, whereafter said mixture is withdrawn from the mixing chamber 16 via line 18 pumped by pump 19 through line 20 into a heat exchanger 22, wherein it is exchanged with heated feed, and is passed from heat exchanger 22 through line 23 into heater 24 wherein it is heated to the clay treating temperature of about 300° F. or above, passing therefrom through line 25 back to heat exchanger 22 wherein it is interchanged with fresh feed as above described to reduce the temperature to the desired extraction temperature as for example about 200° F. to about 230° F. The wax-asphalt clay mixture is discharged from heat exchanger 22 through line 26 controlled by valves 27 and 44 through line 28 into the separator or extraction column 30.

Solvent which may be an alcohol, ketone or ether having from 3 to 5 carbon atoms in its molecule or a mixture of such alcohols, ketones and ethers is taken from the solvent storage tank 32 through line 33 controlled by valve 34 and pumped by pump 35 through line 36 into heater 38 wherein the solvent is heated to a temperature corresponding to that of the feed leaving the heat exchanger 22, passing from heater 38 through line 39 into lines 40 or 43 controlled by valve 41 or 44 respectively. If it is desired to employ countercurrent extraction the feed is introduced to the extractor through line 28 as described above and the solvent passes from line 40 controlled by valve 41 through line 42 at a point below line 28. If, however, it is desired to employ concurrent extraction valve 41 remains closed and valve 44 is open whereby the solvent passes through line 43 and is mixed with the feed in line 26, the mixture passing therefrom through valve 27 and line 28 into the separator 30. In the separator the asphalt and clay settle to the bottom being continuously withdrawn therefrom through line 65 controlled by valve 66 and pumped by pump 67 through line 68 into evaporator 70. Evaporator 70 is equipped with a heating coil 71 whereby the temperature of the asphalt may be maintained at the temperature of extraction or may be increased if desired whereby the solvent is evaporated therefrom passing overhead from evaporator 70 through line 72 controlled by valve 73 through line 74 into condenser 76 from which it is pumped by pump 77 through lines 78 and 57 back to solvent storage tank 32. The upper phase in the separator 30 comprising the wax-solvent solution from which the asphaltic materials as well as the added clay has separated is withdrawn via line 45 controlled by valve 46 via line 47 and is pumped by pump 48 through line 49 into evaporator 50 equipped with heating coil 58 wherein the solvent is evaporated from the wax passing overhead through line 51 controlled by valve 52 via line 53 into condenser 54 and is pumped therefrom by pump 55 through lines 56 and 57 back to the solvent storage tank 32. The solvent free wax is withdrawn from evaporator 50 via line 59 controlled by valve 60 and is pumped by pump 61 through line 62 into the wax product storage tank 64. The solvent free asphaltic residue is withdrawn from evaporator 70 via line 79 controlled by valve 80, is pumped by pump 81 through line 82 to discards or storage as desired.

If it is desired to refine the wax by our extraction process in the absence of any added clay or similar material, the feed may be taken directly from storage tank 10 to heater 24, wherein the temperature is raised to the extraction temperature of about 200° to 230° F., and is passed therefrom directly to the separator 30 whereafter the operation follows that as hereinbefore described. Many modifications of this process may occur to those skilled in the art without departing from the spirit or scope of our invention such as for example a clay treatment following the solvent extraction and the like.

We have found that the type of clay employed in our process as described is of considerable importance inasmuch as certain clays are more effective in this type of operation than others. For example, we have found a magnesia clay containing as high as 90% of magnesium oxide is superior to any other materials known to us, in not only effecting the desired acceleration of asphalt separation when employed prior to the extraction step but also in effecting further decolorization of the wax when employed as a conventional clay treatment after the solvent extraction step. Other clays, however, may be employed such as for example the bentonites, bauxites, fuller's earth and the like.

We have found that by modifying the above procedure we are able in one continuous process to effect the separation of wax-asphalt mixtures containing considerable quantities of oil such as are commonly obtained from conventional dewaxing processes and are generally termed "slack waxes." By employing our process as described with reference to the drawing the oil is obtained with the wax as an oil-solvent-wax solution in the upper phase from the separator 30, whereafter it is chilled to a temperature sufficiently low to effect the precipitation of the wax therefrom, the oil remaining in solution with the solvent permitting the separation of the wax as an oil free decolorized wax from which the solvent may be evaporated as described. Further the solvent may be recovered from the oil in a similar evaporation procedure. It is apparent therefore that by our process we are able to treat either a wax-asphalt or a wax-oil-asphalt mixture by a variety of procedural methods to obtain an oil-free wax of considerably reduced asphalt content having a correspondingly lighter color.

It is important to emphasize the fact that the alcohols, ethers and ketones of 3 carbon atoms are superior to those of 4 or 5 carbon atoms although the latter may be employed effectively on certain types of stocks. We have found for example that isopropyl alcohol, acetone and methyl ethyl ether are excellent solvents when employed in the ratio of from about 2 to 1 to about 10 to 1 and preferably in the ratio of from about 5 to 1 to about 7 to 1 with respect to the wax feed for the extraction or removal of wax from waxasphalt mixtures. Solvents comprising mixtures of these three compounds have also proved to be excellent solvents according to the process of our invention.

The following example will serve to illustrate the effectiveness of the solvent extraction process as herein disclosed on one of the most difficultly purified petroleum waxes.

*Example*

In any crude oil storage, precipitation occurs forming what is known as tank bottoms constituting an asphaltic-wax mixture which upon deoiling produces a jet black high melting point wax containing anywhere from 5% to 10% or more of asphaltic and resinous material. Such a deoiled tank bottoms wax having a melting point of 196° F. was obtained from a California crude and decolorized by three different procedures as follows.

In the first instance this black wax was treated for 25 minutes at 310° F. with 20% by weight of an activated clay. After this contact treatment the mixture was subsequently filtered to yield 70% by weight, based on the original wax charge, of a dark brown wax melting at 190° F. by the American melting point method. This wax still contained between 3.8% and 4.3% asphaltic material accounting for the dark brown color.

A second method of treatment was employed according to our invention in which the black wax was agitated for 15 minutes at 210° F. in the presence of six volumes of isopropyl alcohol. This mixture was then allowed to settle for one hour an upper phase being obtained comprising, on a solvent free basis, 78 volume per cent yield based on the original feed of a light brown wax having a melting point of 190° F. by the American melting point method. This wax contained only 2.3% to 2.8% asphaltic materials accounting for the improved color as compared to that obtained in the clay treatment.

Another run was made in which the black wax was heated to 310° F. in the presence of only 10% by weight of the same clay as employed in run No. 1 above and the mixture was immediately cooled to a temperature of 210° F. and agitated for 15 minutes in the presence of six volumes of isopropyl alcohol, whereafter it was allowed to settle for 45 minutes. Upon removing the upper phase from this settling an 82% yield of solvent free wax, based upon the original black wax employed, was obtained having an American melting point of 190° F. This wax was light tan in color and contained only from about .5% to about 1% of asphaltic material. Significant data from these three runs is tabulated in the table below:

*Table*

| Run Number | 1 | 2 | 3 |
|---|---|---|---|
| Treatment | Clay treat | Extraction | Extraction. |
| Clay used, weight per cent | 20 | 0 | 10. |
| Solvent | 0 | Isopropyl alcohol. | Isopropyl alcohol. |
| Yield of treated wax | 70 | 78 | 82. |
| Melting point, A. M. P., ° F. | 190 | 190 | 190. |
| Asphalt in treated wax, weight per cent | 3.8-4.3 | 2.3-2.8 | 0.5-1.0. |
| Color of treated wax | Dark Brown | Light Brown | Tan. |

It should be pointed out that runs two and three above constitute only batchwise extraction and the results as obtained do not compare favorably with countercurrent extraction. It will be seen that decolorization according to the process of our invention has many advantages over clay or propane decolorization in that solvent recovery is exceedingly good and that the pressure of operation is comparatively low depending upon the vapor pressure of the solvent at the temperatures employed which are for example from about 10 to about 50 pounds per square inch.

The foregoing description of the methods of decolorizing impure waxes is meant only to be illustrative of our invention which comprises the extraction of a wax-asphalt or wax-asphalt-oil mixture, which may or may not contain small amounts of clay, with solvents comprising the alcohols, ketones and ethers of from 3 to 5 carbon atoms or mixtures thereof, and preferably the alcohols, ketones and ethers of 3 carbon atoms or mixtures thereof to selectively separate the wax from the asphaltic or resinous material bringing about thereby its decolorization.

Having fully described our invention and the advantages accruing therefrom and appreciating the fact that many modifications thereof may occur to those skilled in the art without departing from the spirit or scope of the invention, we claim:

1. A process for decolorizing a deoiled asphalt-wax mixture obtained as tank bottoms from crude oil storage and containing more than about 5% of asphaltic and resinous material, said asphalt-wax mixture having a melting point of about 196° F., which comprises heating said asphalt-wax mixture to a temperature of about 300° F. to about 350° F. in the presence of about 10% of clay, cooling said treated mixture to a temperature above its melting point but not substantially above about 275° F. and contacting it with a normally liquid solvent of the class consisting of alcohols, ketones and ethers characterized by having less than 6 carbon atoms in their molecular structure thereby forming an upper phase of wax and solvent and a lower phase of asphaltic components, removing the upper or wax-solvent phase, evaporating the solvent therefrom to give a solvent-free wax having a melting point of about 190° F., and removing the lower or asphaltic phase containing also the clay and evaporating the solvent therefrom leaving an asphaltic-clay residue.

2. A process according to claim 1 in which the solvent is an alcohol.

3. A process according to claim 1 in which the solvent is a ketone.

4. A process according to claim 1 in which the solvent is an ether.

5. A process for decolorizing a deoiled asphalt-wax mixture obtained as tank bottoms from crude oil storage and containing more than about 5% of asphaltic and resinous material, said asphalt-wax mixture having a melting point of about 196° F. which comprises heating said asphalt-wax mixture to a temperature of about 310° F. in the presence of about 10% of clay, cooling said treated mixture to a temperature of about 210° F. and contacting it with isopropyl alcohol thereby forming an upper phase of wax an isopropyl alcohol, and a lower phase of asphaltic components containing a small amount of isopropyl alcohol removing the upper phase and evaporating the isopropyl alcohol therefrom to give a wax having a melting point of about 190° F. and removing the lower phase and evaporating the solvent therefrom leaving an asphaltic-clay residue.

6. A process for decolorizing a de-oiled asphalt-wax mixture obtained as tank bottoms from crude oil storage and containing more than about 5% of asphaltic and resinous material which comprises heating said asphalt-wax mixture to a temperature of about 300° F. to about 350° F. in the presence of about 10% of a solid mineral adsorbent, cooling said treated mixture to a temperature above its melting point but not substantially above about 275° F. and contacting it with a normally liquid solvent of the class consisting of alcohols, ketones and ethers characterized by having less than 6 carbon atoms in their molecular structure, thereby forming an upper phase of wax and solvent and a lower phase of asphaltic components, removing the upper or wax-solvent phase, evaporating the solvent therefrom to give a solvent free-wax having a melting point of about 190° F. and removing the lower or asphaltic phase containing also the solid mineral adsorbent and evaporating the solvent therefrom.

PAUL L. POLIZZOTTO.
P. STANLEY BACKLUND.

REFERENCES CITED

The following references are of record in the file of this patent:

UNITED STATES PATENTS

| Number | Name | Date |
|---|---|---|
| 284,437 | Kendall | Sept. 4, 1883 |
| 1,278,023 | Rosenbaum | Sept. 3, 1918 |
| 1,392,370 | Treneer | Oct. 4, 1921 |
| 1,813,327 | Souther et al. | July 7, 1931 |
| 1,848,636 | Livingstone | Mar. 8, 1932 |
| 1,951,861 | Cox | Mar. 20, 1934 |
| 2,049,059 | Goss et al. | July 28, 1936 |
| 2,121,518 | Breth et al. | June 21, 1938 |
| 2,166,893 | Holsten | July 18, 1939 |